United States Patent [19]

Draghetti et al.

[11] Patent Number: 5,765,675
[45] Date of Patent: Jun. 16, 1998

[54] METHOD AND DEVICE FOR TIP-UP CONVEYING PACKETS OF CIGARETTES

[75] Inventors: Fiorenzo Draghetti, Medicina; Andrea Biondi, Bologna, both of Italy

[73] Assignee: G.D Societa' Per Azioni, Bologna, Italy

[21] Appl. No.: 878,974

[22] Filed: Jun. 19, 1997

[30] Foreign Application Priority Data

Jun. 21, 1996 [IT] Italy .................. B096A0345

[51] Int. Cl.⁶ .................................................. B65G 15/00
[52] U.S. Cl. ........................ 198/408; 198/417; 198/412; 131/94
[58] Field of Search ........................ 198/470.1, 803.9, 198/408, 417, 412, 467.1; 131/94

[56] References Cited

U.S. PATENT DOCUMENTS

| | | | |
|---|---|---|---|
| 2,604,200 | 7/1952 | Hohl et al. | 131/94 |
| 3,785,473 | 1/1974 | Cook | 131/94 |
| 4,549,645 | 10/1985 | Applegate | 198/408 |
| 4,925,001 | 5/1990 | Möllenkamp | 198/412 |
| 5,355,991 | 10/1994 | Baranowski | 198/412 |

FOREIGN PATENT DOCUMENTS

| | | | |
|---|---|---|---|
| 1085465 | 7/1960 | Germany | 131/94 |
| 7827963 | 1/1979 | Germany | 131/94 |
| 59-12012 | 1/1984 | Japan | 131/94 |

Primary Examiner—Aaron J. Lewis
Assistant Examiner—Charles W. Anderson
Attorney, Agent, or Firm—Marshall, O'Toole, Gerstein, Murray & Borun

[57] ABSTRACT

A method and device for tip-up conveying packets of cigarettes, whereby packets of cigarettes, fed successively to an input of a guide, are transferred to an output of the guide by a screw transferring member rotating about a respective axis; the screw defining at least one substantially helical channel along which the packets slide as the screw rotates, and which winds by an angle of 90° about its own longitudinal axis.

16 Claims, 5 Drawing Sheets

METHOD AND DEVICE FOR TIP-UP CONVEYING PACKETS OF CIGARETTES

BACKGROUND OF THE INVENTION

The present invention relates to a method of tip-up conveying packets of cigarettes.

Here and hereinafter, "tip-up" is intended to mean a 90° rotation of a packet about its longitudinal axis, so that the packet, formerly laid flat, is positioned on edge.

The present invention may be used to advantage for transferring packets of cigarettes from the output of a cellophaning machine to the input of a cartoning machine, to which the following description refers purely by way of example.

In cigarette packing systems comprising a cellophaning machine and a cartoning machine connected in series, it is often necessary to the tip the packets 90° about an axis of symmetry, more specifically the longitudinal axis, to form groups of packets of a given configuration.

In known systems, this is normally done using step-operated tipping devices, which are invariably expensive and complex in design.

SUMMARY OF THE INVENTION

It is an object of the present invention to provide a method of feeding packets continuously or in steps along a given path, while at the same time tipping the packets 90° about their respective axes.

According to the present invention, there is provided a method of tip-up conveying packets of cigarettes, the method comprising the steps of feeding packets of cigarettes successively to a guide comprising an input for the packets and an output for the packets; and successively transferring the packets from said input to said output via screw transferring means; the method being characterized in that said screw transferring means comprise a single screw transferring member having at least a peripheral channel for the packets; the screw transferring member being rotated about a first axis to feed the packets along said channel and said guide; and said channel comprising a longitudinal second axis extending substantially helically about the first axis, and winding about the second axis by an angle of 90° to tip said packets up 90° as they travel between said input and said output.

According to a preferred embodiment of the above method, said input and said output are located at different levels.

Alternatively, said input and said output are located substantially at the same level.

In the above method, said guide extends by a given angle about said first axis; and the size of the angle corresponds to any one of 0°, 90° and 180°.

The present invention also relates to a device for tip-up conveying packets of cigarettes.

According to the present invention, there is provided a device for tip-up conveying packets of cigarettes, the device comprising a guide, in turn comprising an input for the packets and an output for the packets; supply means for successively feeding the packets to said input; and screw transferring means for successively transferring the packets from said input to said output; characterized in that said screw transferring means comprise a single screw transferring member rotating about a first axis, and having at least a peripheral channel along which, in use, the packets travel as the screw transferring member rotates about the first axis, and as the packets travel along said guide; said channel comprising a longitudinal second axis, which extends substantially helically about the first axis, and winds about the second axis by an angle of 90° to tip said packets up 90° as they travel between said input and said output.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
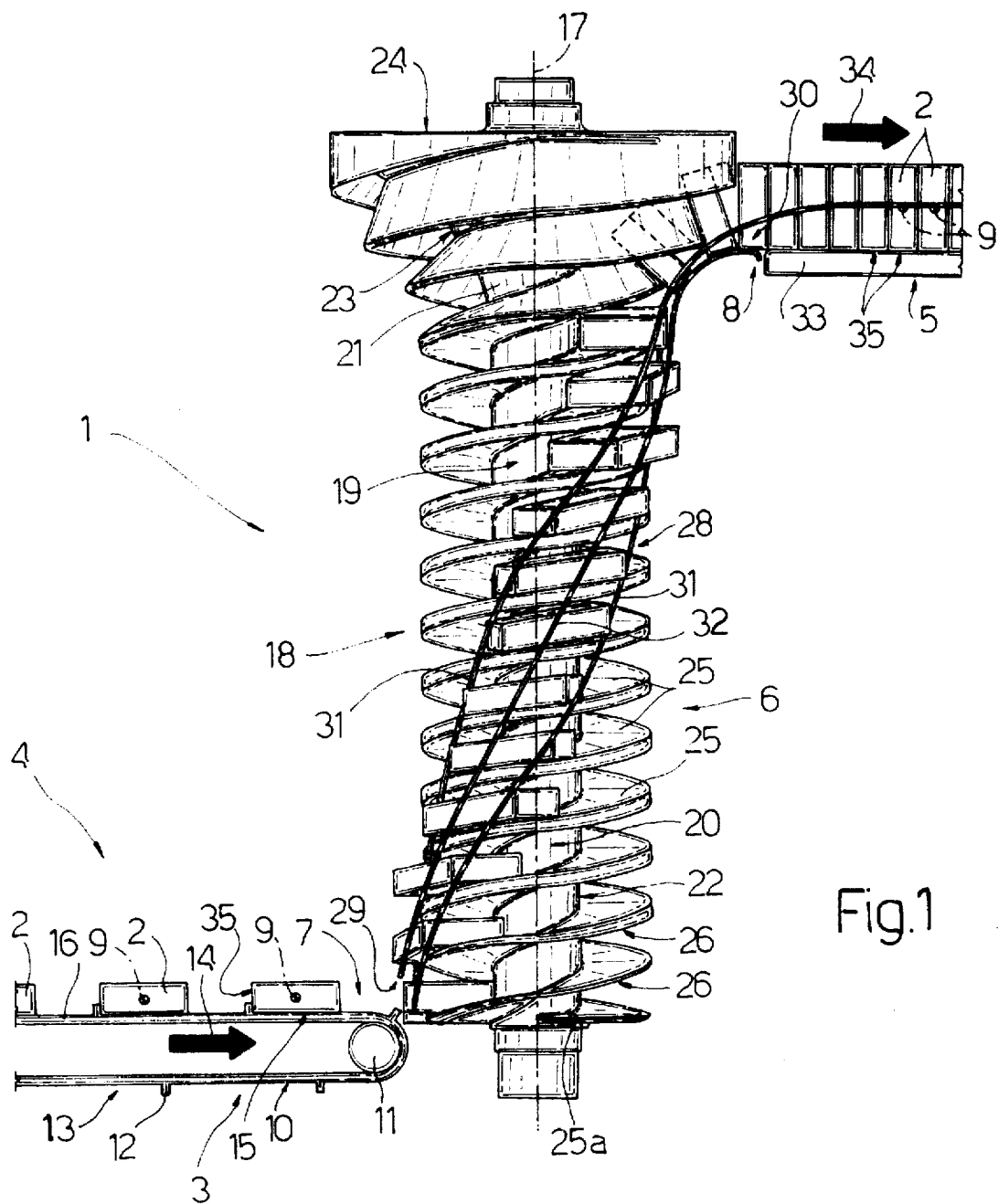
FIG. 1 shows a schematic side view, with parts removed for clarity, of a first preferred embodiment of the conveying device according to the present invention.
Figure 2:
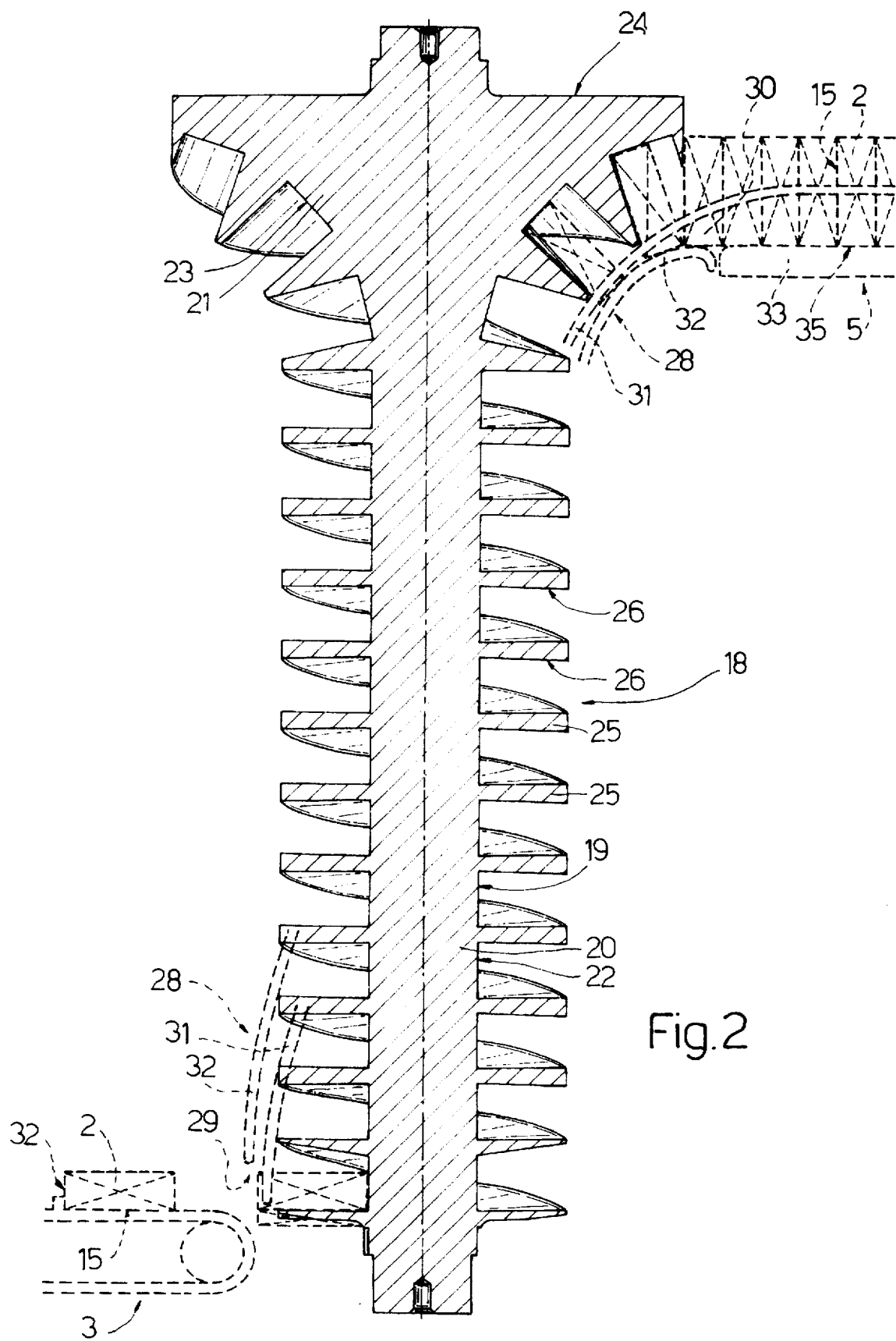
FIG. 2 shows a longitudinal section of the FIG. 1 device.
Figure 3:
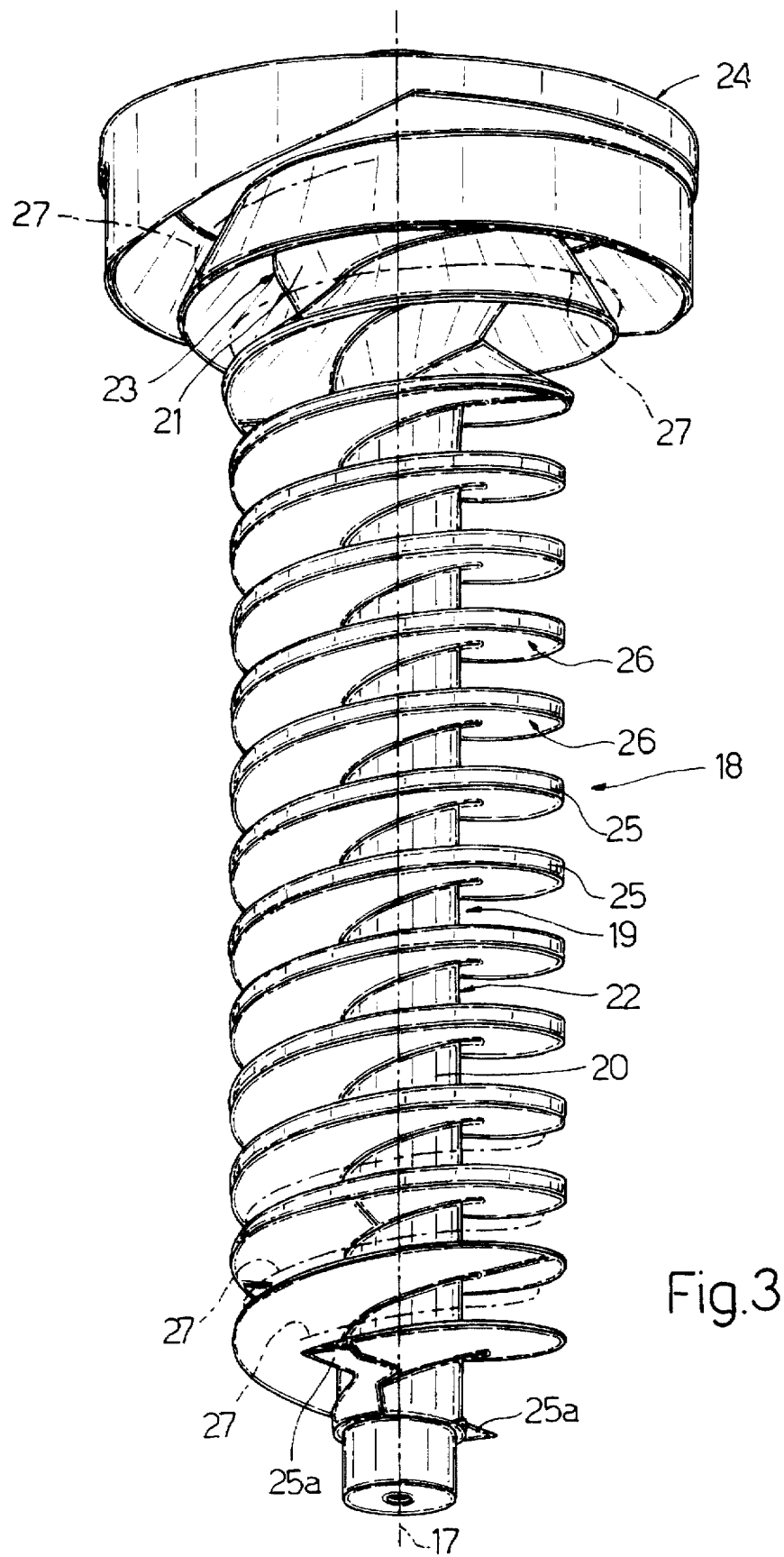
FIG. 3 shows a three-quarter bottom view in perspective of a detail in FIG. 1.

Number 1 in FIG. 1 indicates a conveying device for conveying packets 2 of cigarettes. Device 1 comprises an input conveyor 3 comprising, in the example shown, an output conveyor belt of a cellophaning machine 4; an output conveyor 5 located at a higher level than conveyor 3, and for transferring packets 2 to the input conveyor (not shown) of a known cartoning machine (not shown); and a transfer device 6 interposed between the output 7 of conveyor 3 and the input 8 of conveyor 5, and for imparting to packets 2 a movement comprising both a vertical component such as to transfer packets 2 from the level of conveyor 3 to the level of conveyor 5, and a 90° tip-up movement about respective longitudinal axes 9 perpendicular to the FIG. 1 plane.

Conveyor 3 comprises a belt 10 looped about two pulleys 11 (only one shown), one of which is a drive pulley for moving belt 10 in steps or continuously. Belt 10 comprises a number of outer projections 12 equally spaced along belt 10 to define a succession of pockets 13, each for receiving a respective packet 2 positioned, in the example shown, with its longitudinal axis 9 crosswise to the traveling direction 14 of belt 10. Each packet 2 is also laid flat on belt 10, i.e. with a large lateral surface 15 contacting the substantially horizontal upper conveying branch 16 of belt 10.

Transfer device 6 extends along a substantially vertical axis 17, and comprises a single transfer member comprising a screw 18 rotated at substantially constant speed about axis 17 by a known motor (not shown). Screw 18 comprises an inner core 19 coaxial with axis 17, and in turn comprising a bottom portion 20 and a top portion 21. Bottom portion 20 is defined externally by a surface 22, which, though cylindrical in the example shown, may be shaped differently; and top portion 21 is substantially mushroom-shaped and defined externally by a surface 23 substantially in the form of a paraboloid of revolution, which is connected at the bottom to the top end of surface 22, flares outwards and upwards, and is defined at the top by a flat surface 24 perpendicular to axis 17.

Screw 18 may be a single-start screw. In the example shown, however, screw 18 is a multi-start screw comprising, in the example shown, two helical threads defined by respective substantially flat strips 25 winding about core 19. More specifically, each strip 25 is maintained substantially perpendicular to axis 17 along bottom portion 20, and is maintained substantially perpendicular to surface 23 along top portion 21, so that, along top portion 21, each strip 25 rotates gradually downwards from a substantially horizontal position perpendicular to axis 17 at the top end of portion 20, to a substantially vertical position parallel to axis 17 at the top end of portion 21.

Strips 25 define, with core 19, two outwardly-open channels 26 of a height approximately equal to but no less than the thickness of a packet 2 measured perpendicularly to branch 16 of belt 10 on conveyor 3, and of a depth, measured radially with respect to core 19, less than the width of packet 2 measured parallel to direction 14 on conveyor 3.

Each channel 26 comprises a longitudinal axis 27, which, in the example shown, extends helically along bottom portion 20 of core 19, but extends helically in elevation and spirally in horizontal section along top portion 21 of core 19. As a consequence of the different positions assumed by each strip 25 with respect to core 19 along portions 20 and 21, each channel 26 extends substantially helically about bottom portion 20 of core 19, with its concavity facing substantially radially outwards with respect to axis 17, but, along portion 21, extends helically about axis 17 and, at the same time, by 90° about its own axis 27 so that it is eventually positioned with its concavity facing downwards.

In addition to screw 18, transfer device 6 also comprises a fixed guide 28 extending by a given angle about screw 18 and axis 17, and having an input 29 and an output 30, which are respectively located facing output 7 of conveyor 3 and input 8 of conveyor 5, and respectively enable packet 2 to be fed into and out of guide 28.

Guide 28 comprises two lateral bars 31, which are substantially tangent to the outer surface of screw 18, are located at a constant distance from surfaces 22 and 23 approximately equal to but no greater than the dimension of packet 2 measured parallel to direction 14 on conveyor 3, and are separated by a distance approximately equal to but no less than the dimension of packet 2 measured crosswise to direction 14 and parallel to the surface of branch 16 on conveyor 3. Guide 28 also comprises an intermediate bar 32 located between bars 31 and at a distance from outer surfaces 22 and 23 of core 19 approximately equal to but no less than the dimension of packet 2 measured parallel to direction 14 -on conveyor 3.

Whereas bars 31 extend beyond input 29 of guide 28, bar 32 extends from a point just over input 29, so as to define the upper limit of input 29. At output 30 of guide 28, bars 31 and 32 extend in a direction substantially parallel to surface 24, and, whereas bar 32 is interrupted at the input of a plate 33 defining conveyor 5 and coplanar with the top end of bar 32, the two bars 31 extend over plate 33 to guide packets 2 along plate 33 in a substantially radial direction 34 with respect to axis 17.

In actual use, conveyor 3 is so timed in relation to screw 18 as to feed a packet 2 through input 29 into each channel 26 each time a loading portion 25a of respective strip 25 travels past input 29. As soon as packet 2 is fed into respective channel 26 and arrested against surface 22 of portion 20 of core 19, the next turn of screw 18 feeds packet 2 upwards and on to the inside of intermediate bar 32; and, as screw 18 is rotated further, packet 2 is slid along respective strip 25 and along guide 28 to output 30.

On reaching portion 21 of core 19, each packet 2 begins rotating about axis 27 of respective channel 26, and, prior to reaching output 30, is rotated 90° about axis 27 and about its own axis 9 so that it is positioned on edge at output 30. More specifically, at output 30, each packet 2 is entirely supported by bar 32, and is pushed by the following packets 2 along plate 33, on which packet 2 is positioned on edge with its longitudinal surface 35, formerly contacting a projection 12 of conveyor 3, contacting plate 33.

In connection with the above, it should be pointed out that, whereas, in the embodiment shown, guide 28 extends about screw 18 and axis 17 by an angle of substantially 180°, and directions 14 and 34 are parallel to each other, guide 28 may obviously extend about axis 17 by any angle between 0° and 360°, so that directions 14 and 34 may form any angle between 0° and 180°. In other words, transfer device 6 provides for successively transferring packets 2 between two conveyors 3 and 5 at different levels and so oriented as to form any angle between 0° and 180°, thus eliminating any problems as regards the layout of the system.

At the same time, transfer device 6 provides for receiving packets 2, laid flat, from conveyor 3, and transferring packets 2, on edge, to conveyor 5.

Obviously, by inverting the position and function of conveyors 3 and 5, by inverting screw 18 so that portion 21 is beneath portion 20, and by inverting the rotation of screw 18, transfer device 6 is capable of receiving a succession of packets 2 on edge, and supplying a succession of packets 2 laid flat.

Figure 4:
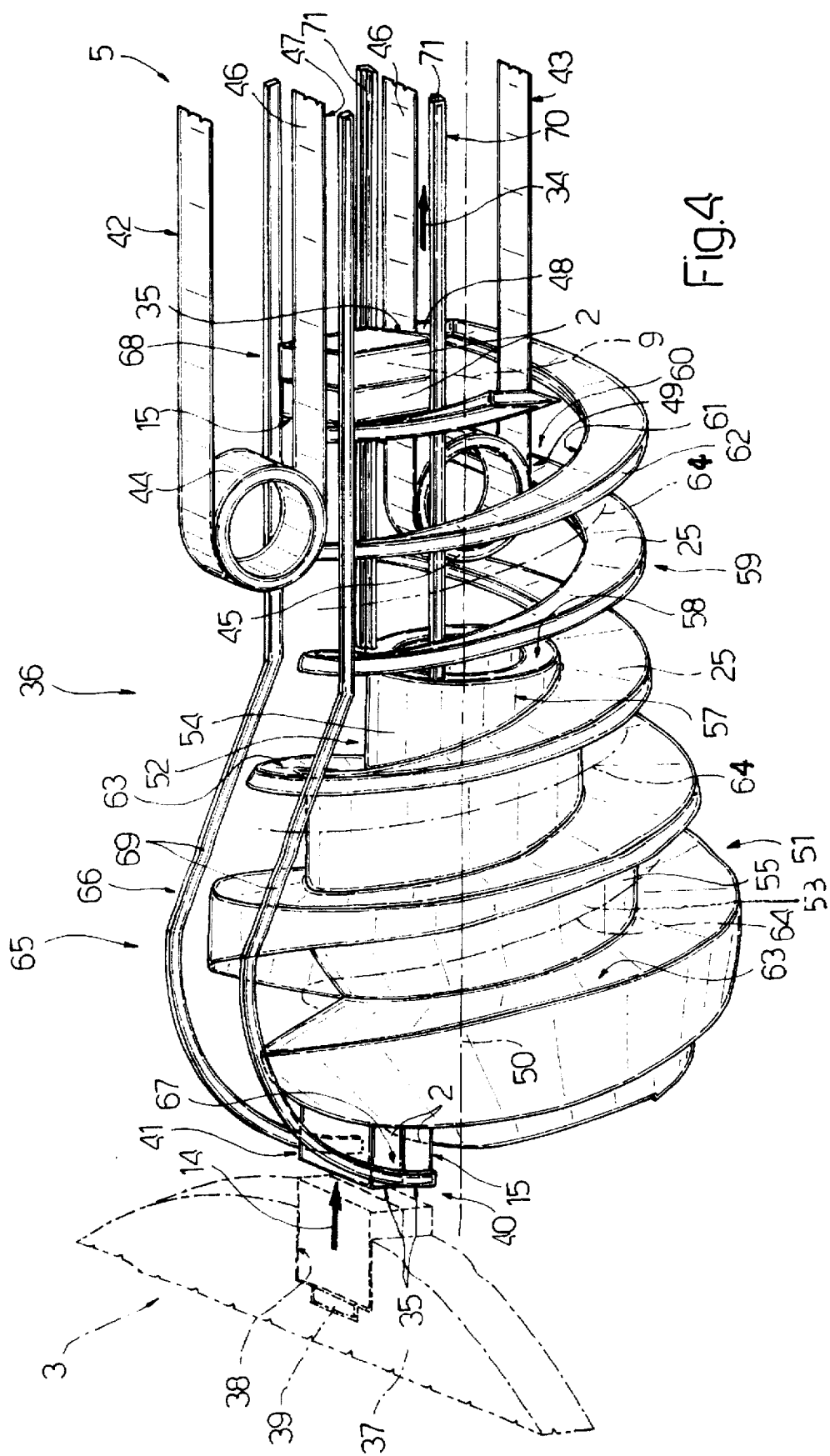
FIGS. 4 and 5 show schematic views in perspective, with parts removed for clarity, of a second preferred embodiment of the conveying device according to the present invention.
Figure 5:
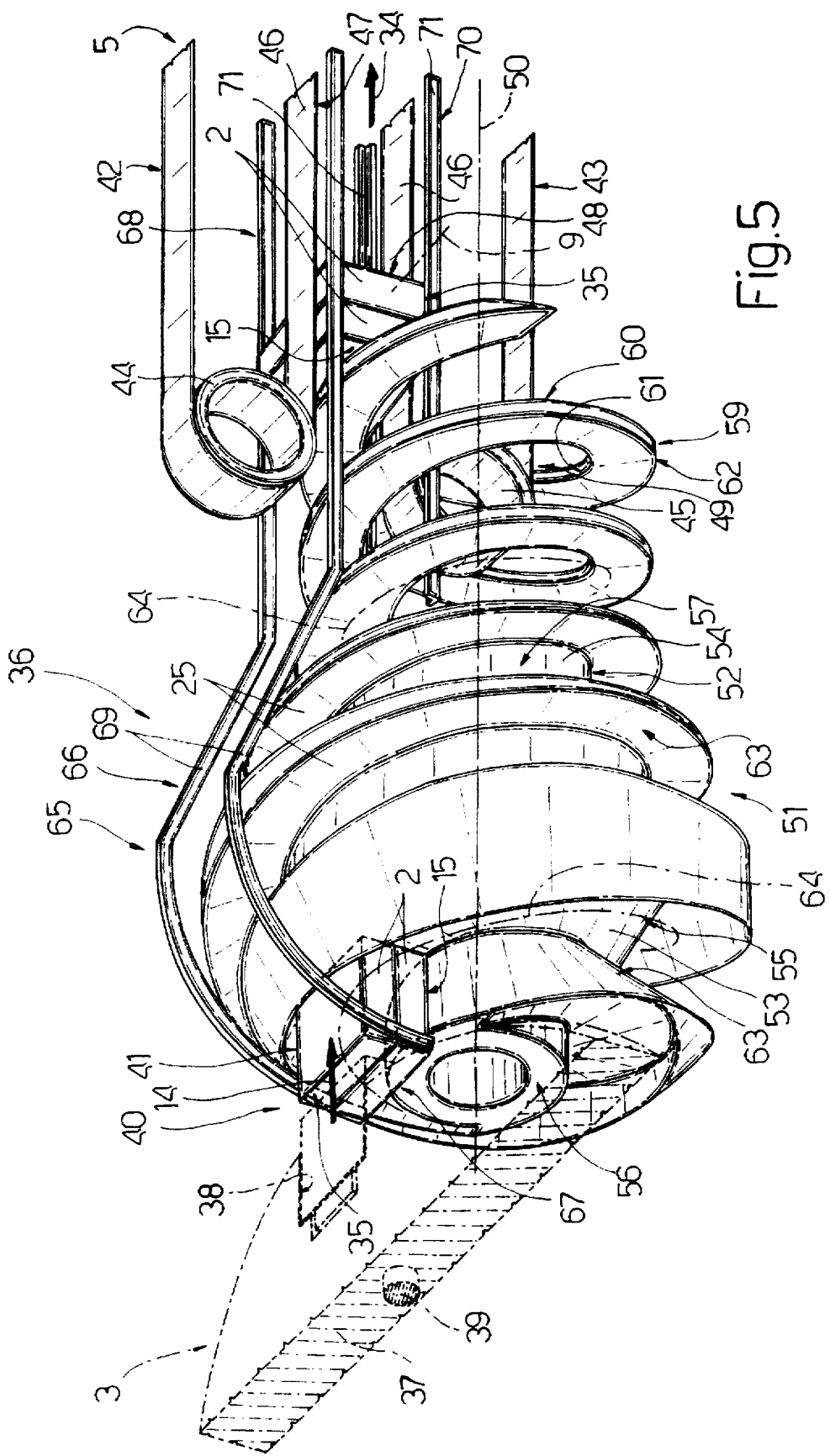

The FIG. 4 and 5 embodiment relates to a conveying device 36, wherein input conveyor 3 comprises a known conveying wheel 37 with a number of peripheral pockets 38, each for housing and retaining at least a respective packet 2 laid flat, and each comprising a pusher 39, which is movable to and from an extracted position to unload respective packet 2 in direction 14 at a transfer station 40. In the specific embodiment shown, direction 14 is substantially radial with respect to wheel 37, and each pocket 38 houses a stack or group 41 defined by two packets 2 laid flat one on top of the other, i.e. with surface 15 substantially perpendicular to the axis of rotation (not shown) of wheel 37 and parallel to direction 14. As opposed to a group 41, the whole of device 36 may obviously be redimensioned to transfer a single packet 2 laid flat.

Output conveyor 5 of device 36 is defined by two superimposed conveyor belts 42 and 43 looped about respective pulleys 44 and 45. Belts 42 and 43 are located the first over the second, and comprise respective superimposed conveying branches 46 facing each other and traveling in direction 34, which, in this case, is substantially parallel to and aligned with direction 14. The two branches 46 define an output channel 47 for a succession 48 of packets 2 on edge, i.e. with surface 35 contacting the bottom branch 46, with surface 15 facing rearwards in direction 34, and with longitudinal axis 9 crosswise to direction 34.

Transfer device 6 of device 36 is interposed between station 40 and an input portion 49 of conveyor 5 to tip packets 2 up 90° about longitudinal axis 9, which is moves parallel to itself from conveyor 3 to conveyor 5.

Transfer device 6 of device 36 extends along a substantially horizontal axis 50 parallel to directions 14 and 34, and comprises a single transfer member in turn comprising a screw 51 rotated at substantially constant speed about axis 50 by a known motor (not shown). Screw 51 comprises an inner core 52 coaxial with axis 50 and in turn comprising an input portion 53 and an output portion 54. Input portion 53 is defined externally by a surface 55, which, in the example shown, is a substantially truncated-cone-shaped step surface tapering towards station 40 and defined, at station 40, by a flat, substantially circular surface 56 crosswise to axis 50.

Output portion 54 is defined externally by a substantially truncated-cone-shaped step surface 57, the larger end of which is adjacent to the larger end of surface 55, and the smaller end of which is defined by a flat, substantially circular surface 58 crosswise to axis 50.

In the example shown, screw 51, which may be a single-start screw, comprises two threads, each defined by a strip 25 winding about core 52. More specifically, each strip 25 is maintained substantially perpendicular to axis 50 along output portion 54, whereas, along surface 55, from surface 56 towards surface 57, each strip 25 rotates, with respect to axis 50, from a position substantially parallel, to a position perpendicular to axis 50.

As shown in FIGS. 4 and 5, a substantially cylindrical end portion (not shown) of core 52 facing conveyor 5 is removed to form, inwards of an end portion 59 of strips 25, a cavity 60, the end wall of which is defined by surface 58. Cavity 60 is engaged by an input portion of belt 43, the branch 46 of which is substantially tangent to an inner edge 61 of portion 59 of strips 25, while the branch 46 of belt 42 is substantially tangent to an outer edge 62 of portion 59.

Strips 25 define two outwardly-open channels 63 of a height approximately equal to but no less than the thickness of a group 41 measured perpendicularly to surfaces 15 of respective packets 2, and of a depth smaller than the width of packets 2 measured perpendicularly to respective surfaces 35.

Each channel 63 has a longitudinal axis 64, which, in the example shown, extends helically in elevation and spirally in horizontal section along input portion 53 and output portion 54 of core 52, but which extends substantially in the form of a cylindrical coil along portion 59.

As a consequence of the different positions assumed by each strip 25 with respect to core 52 along portions 53 and 54, each channel 63 extends substantially helically about output portion 54 of core 52, with its concavity facing substantially radially outwards with respect to axis 50, but, along portion 53, extends helically about axis 50 and, at the same time, by 90° about its own axis 64, so that it is eventually positioned with its concavity facing the periphery of wheel 37 and parallel to axis 50.

In addition to screw 51, transfer device 6 of conveying device 36 also comprises a fixed guide unit 65 substantially coplanar with axis 50 and in turn comprising a first guide 66, which extends over screw 51 at a substantially constant distance from surfaces 55 and 57, and such that the distance between guide 66 and the end of channels 63 is maintained approximately equal to but no greater than the width of packets 2 measured perpendicularly to respective surfaces 35. Guide 66 comprises an input 67 at station 40, and an output portion 68, which is parallel to axis 50 and extends outside portion 59 and along channel 47.

Guide 66 comprises two lateral bars 69 substantially tangent to the outer surface of screw 51, and separated by a distance approximately equal to but no less than the dimension of packet 2 measured parallel to respective axis 9.

Unit 66 also comprises a guide 70 parallel to and facing output portion 68 of guide 66, and in turn comprising two straight bars 71 extending inside and outwards of cavity 60, and which are coplanar with and located on either side of branch 46 of belt 43. Bars 71 have an L-shaped section to define a cavity of a width approximately equal to but no less than the dimension of packet 2 measured parallel to respective axis 9.

Operation of conveying device 36 may be deduced, with no further explanation, from what has already been said in connection with conveying device 1. It should be stressed, however, that, in the case of conveying device 36, each group 41, on reaching cavity 60, is supported, not by screw 51, but by guide 70 as it is fed along the portion of respective channel 63 extending along portion 59 strips 25. Moreover, cavity 60 enables guide unit to extract packets 2 axially and feed them in a direction substantially aligned with the input direction, after tipping them up 90° about respective longitudinal axes 9. In the FIG. 4 and 5 example, guide 66 is coplanar with axis 50, i.e. extends by an angle of zero degrees about axis 50. If, however, the portion of guide upstream from output portion 68 were to extend about s 50 by an angle of, say, 90°, portion 68 would be positioned in a vertical plane parallel to axis 50. And, guide 70 were also to be positioned in a vertical e, it would be possible to obtain on conveyor 5 o positioned with branches 46 in parallel vertical planes, and possibly associated with a further horizontal conveyor beyond the end of screw 51—a cession of packets 2 not only on edge but also rotated 90° about an axis perpendicular to surface 15.

We claim:

1. A method of tip-up conveying packets (2) of cigarettes, the method comprising the steps of feeding packets (2) of cigarettes successively to a guide (28; 66) comprising an input (29; 67) for the packets (2) and an output (30; 68) for the packets (2); and successively transferring the packets (2) from said input (29; 67) to said output (30; 68) via screw transferring means (6); the method being characterized in that said screw transferring means (6) comprise a single screw transferring member (18; 51) having at least a peripheral channel (26; 63) for the packets (2); the screw transferring member (18; 51) being rotated about a first axis (17; 50) to feed the packets (2) along said channel (26; 63) and said guide (28; 66); and said channel (26; 63) comprising a longitudinal second axis (27; 64) extending substantially helically about the first axis (17; 50), and winding about the second axis (27; 64) by an angle of 90° to tip said packets (2) up 90° as they travel between said input (29; 67) and said output (30; 68).

2. A method as claimed in claim 1, characterized in that said input (29; 67) and said output (30; 68) are located at different levels.

3. A method as claimed in claim 1, characterized in that said input (29; 67) and said output (30; 68) are located substantially at the same level.

4. A method as claimed in claim 1, characterized in that said guide (28; 66) extends by a given angle about said first axis (17; 50).

5. A method as claimed in claim 4, characterized in that the size of said given angle corresponds to any one of 0°, 90° and 180°.

6. A device for tip-up conveying packets (2) of cigarettes, the device comprising a guide (28; 66), in turn comprising an input (29; 67) for the packets (2) and an output (30; 68) for the packets (2); supply means (3) for successively feeding the packets (2) to said input (29; 67); and screw transferring means (6) for successively transferring the packets (2) from said input (29; 67) to said output (30; 68); the device (1; 36) being characterized in that said screw transferring means (6) comprise a single screw transferring member (18; 51) rotating about a first axis (17; 50), and having at least a peripheral channel (26; 63) along which, in use, the packets (2) travel as the screw transferring member (18; 51) rotates about the first axis (17; 50), and as the packets (2) travel along said guide (28; 66); said channel (26; 63) comprising a longitudinal second axis (27; 64), which extends substantially helically about the first axis (17;

50), and winds about the second axis (27; 64) by an angle of 90° to tip said packets (2) up 90° as they travel between said input (29; 67) and said output (30; 68).

7. A device as claimed in claim 6, characterized in that said input (29) and said output (30) are located at different levels.

8. A device as claimed in claim 6, characterized in that said input (67) and said output (68) are located substantially at the same level.

9. A device as claimed in claim 6, characterized in that said guide (28; 66) is substantially tangent to an outer periphery of said screw transferring member (18; 51), and extends by a given angle about said first axis (17; 50).

10. A device as claimed in claim 9, characterized in that the size of said given angle corresponds to any one of 0°, 90° and 180°.

11. A device as claimed in claim 6, characterized in that said screw transferring member (18; 51) comprises an inner core (19; 52) coaxial with said first axis (17; 50) and in turn comprising two portions (20,21; 53,54); and at least a helical thread winding about the core (19; 52); a first (21; 53) of said two portions (20,21; 53,54) of the core (19; 52) being substantially mushroom-shaped; and said helical thread being defined by a substantially flat strip (25) extending helically about the core (19; 52); said strip (25) being maintained in a position substantially crosswise to said first axis (17; 50) along a second (20; 54) of said two portions (20,21; 53,54), and rotating about said second axis (27; 64) between a position substantially crosswise to and a position substantially parallel to the first axis (17; 50) along said first portion (21; 53).

12. A device as claimed in claim 11, characterized in that said first and said second portion (20,21; 53,54) extend respectively along an output portion and an input portion of said screw transferring member (18; 51).

13. A device as claimed in claim 11, characterized in that said first and said second portion (20,21; 53,54) extend respectively along an input portion and an output portion of said screw transferring member (18; 51).

14. A device as claimed in claim 13, characterized in that said strip (25) is oriented in a direction substantially parallel to said first axis (17; 50) at said input (29; 67).

15. A device as claimed in claim 13, characterized by comprising an axial cavity (60) formed by removing an end portion of said second portion of the core (52); said channel (63) communicating laterally with said cavity (60); said guide (66) being an outer guide (28; 66); and an inner guide (70) being provided, which extends along said cavity (60) and parallel to said outer guide (66).

16. A device as claimed in claim 15, characterized by comprising output conveying means (5) for receiving said packets (2) at said output (30; 68); a portion of said output conveying means (5) extending inside said cavity (60).

* * * * *